United States Patent
Gordon et al.

(10) Patent No.: US 7,339,972 B2
(45) Date of Patent: Mar. 4, 2008

(54) LASER FILAMENT IMAGER

(75) Inventors: Daniel Gordon, Waldorf, MD (US);
Antonio Ting, Silver Spring, MD (US);
Eldridge Briscoe, San Diego, CA (US)

(73) Assignee: United States of America as represented by the Secretary of the Navy, Washington, DC (US)

(*) Notice: Subject to any disclaimer, the term of this patent is extended or adjusted under 35 U.S.C. 154(b) by 253 days.

(21) Appl. No.: 11/169,263

(22) Filed: Jun. 27, 2005

(65) Prior Publication Data

US 2006/0291518 A1  Dec. 28, 2006

(51) Int. Cl.
*H01S 3/223* (2006.01)
(52) U.S. Cl. .......................... 372/55; 372/59
(58) Field of Classification Search ................ 372/55, 372/59, 60, 61
See application file for complete search history.

(56) References Cited

U.S. PATENT DOCUMENTS 3,633,650 A * 1/1972 Schaumburg ............... 164/477
6,487,229 B2 * 11/2002 Govorkov et al. ............ 372/57
6,624,424 B2 * 9/2003 Eckert et al. ................ 250/372

OTHER PUBLICATIONS

La Fontaine, B., "Filamentation of ultrashort pulse laser beams resulting from their propagation over long distances in air" Physics of Plasmas vol. 6, No. 5 May 1999 pp. 1615-1621.
Courvoisier, F., "Ultraintense light filaments transmitted through clouds" Applied Physics Letters vol. 83, No. 2 Jul. 14, 2003 pp. 213-215.
Ladouceur, H.D., "Electrical conductivity of a femtosecond laser generated plasma channel in air" Optics Communications 189 (2001) pp. 107-111.
Tzortzakis, S., "Time-evolution of the plasma channel at the trail of a self-guided IR femtosecond laser pulse in air" Optics Communications 181 (2000) pp. 123-127.

* cited by examiner

*Primary Examiner*—Armando Rodriguez
(74) *Attorney, Agent, or Firm*—John J. Karasek; Suresh Koshy

(57) ABSTRACT

An apparatus includes a gas chamber comprising a gas feed nozzle, an exhaust nozzle, and a window. The apparatus also includes a first partial reflector, in the gas chamber, sharing an optical path with the exhaust nozzle, and the window. Optionally, The apparatus includes a gas source communicating with the gas feed nozzle. Optionally, the gas source includes a gas having an ionization potential higher than air and a nonlinear index of refraction lower than air.

6 Claims, 2 Drawing Sheets

LASER FILAMENT IMAGER

TECHNICAL FIELD

The present invention relates generally to an apparatus for determining characteristics of a laser filament, and more particularly to an apparatus for providing an measuring, for example, fluence, spatial dimensions, spatially resolved spectral information, and/or electromagnetic energy inside or outside the laser filament.

BACKGROUND ART

Laser filamentation in air is a subject that is being pursued with great interest all around the world because of potential applications in the areas of directed energy, remote sensing, and artificial lightning. These applications are being pursued by universities, national laboratories, and private companies.

Current methods used to characterize laser filaments are indirect and error prone. B. L. Fontaine et al., "Filamentation of ultrashort pulse laser beams resulting from their propagation over long distances in air," Phys. Plasmas 6, 1615 (1999), incorporated herein by reference, discusses a method that reflects the filaments from a dielectric mirror inclined at an obtuse angle of incidence and image the surface of the mirror. Using this approach, (i) the mirror is damaged after a small number of exposures and/or (ii) the nonlinear interaction between the filaments and the mirror can strongly perturb the reflected light and therefore corrupt the measurement. Another approach attempts to characterize the plasma created by the filaments. This is done by interferometry, by diffractometry, or by making electrical conductivity measurements between two electrodes. S. Tzortzakis et al., "Time-evolution of the plasma channel at the trail of a self-guided IR femtosecond laser pulse in air," Opt. Comm. 181, 123-127 (2000) is incorporated herein by reference. H. Ladouceur et al., "Electrical conductivity of a femtosecond laser generated plasma channel in air," Opt. Comm. 189, 107-111 (2001) is incorporated herein by reference. In practice, such approaches can be error prone because of the uncertainties in the relation between the plasma and the radiation that formed it. Another approach lets the filament drill a hole through a foil and measure the transmitted energy. F. Courvoisier et al., "Ultraintense light filaments transmitted through clouds," Appl. Phys. Lett. 83, 213-215 (2003). In practice, this approach has several disadvantages including the necessity to guess the relation between the hole size and the filament size, the inability to characterize more than one filament at a time, the inability to characterize the surrounding radiation, and/or the inability to resolve details of the fluence distribution.

DISCLOSURE OF THE INVENTION

According to an embodiment of the invention, an apparatus includes a gas chamber comprising a gas feed nozzle, an exhaust nozzle, and a window. The apparatus also includes a first partial reflector, in the gas chamber, sharing an optical path with the exhaust nozzle, and the window.

Optionally, the apparatus further includes a gas source communicating with the gas feed nozzle. For example, the gas source includes a gas having an ionization potential higher than air and a nonlinear index of refraction lower than air. For example, the gas includes helium or neon.

Optionally, the exhaust nozzle includes a venturi shape.

Optionally, the first partial reflector includes filter glass.

Optionally, the apparatus further includes a lens outside of the gas chamber and sharing the optical path. For example, the lens includes a converging spherical lens, a converging aspherical lens, an achromat, a curved spherical mirror, or a curved parabolic mirror.

Optionally, the apparatus further includes a mirror outside of the gas chamber and sharing the optical path. For example, the mirror has a minimum 20% bandwidth. For example, the mirror includes a broadband dielectric mirror. For example, the mirror includes a metal. For example, the metal comprises aluminum.

Optionally, the apparatus further includes a camera sharing said optical path. For example, the camera includes a charge coupled device array. Optionally, the apparatus further includes a neutral density filter sharing the optical path between the mirror and the camera, or a second partial reflector sharing the optical path between the mirror and the camera.

Optionally, the gas chamber includes a Reynolds number less than 1000.

An embodiment of the invention is capable of quantitatively characterizing multiple filaments and the radiation surrounding them simultaneously. In an embodiment of the invention, there are no nonlinear interactions in the measurement device itself, which means the data obtained is straightforward to interpret and free from systematic errors. In an embodiment of the invention, the data can be calibrated absolutely.

BEST MODES OF CARRYING OUT THE INVENTION

Figure 1:
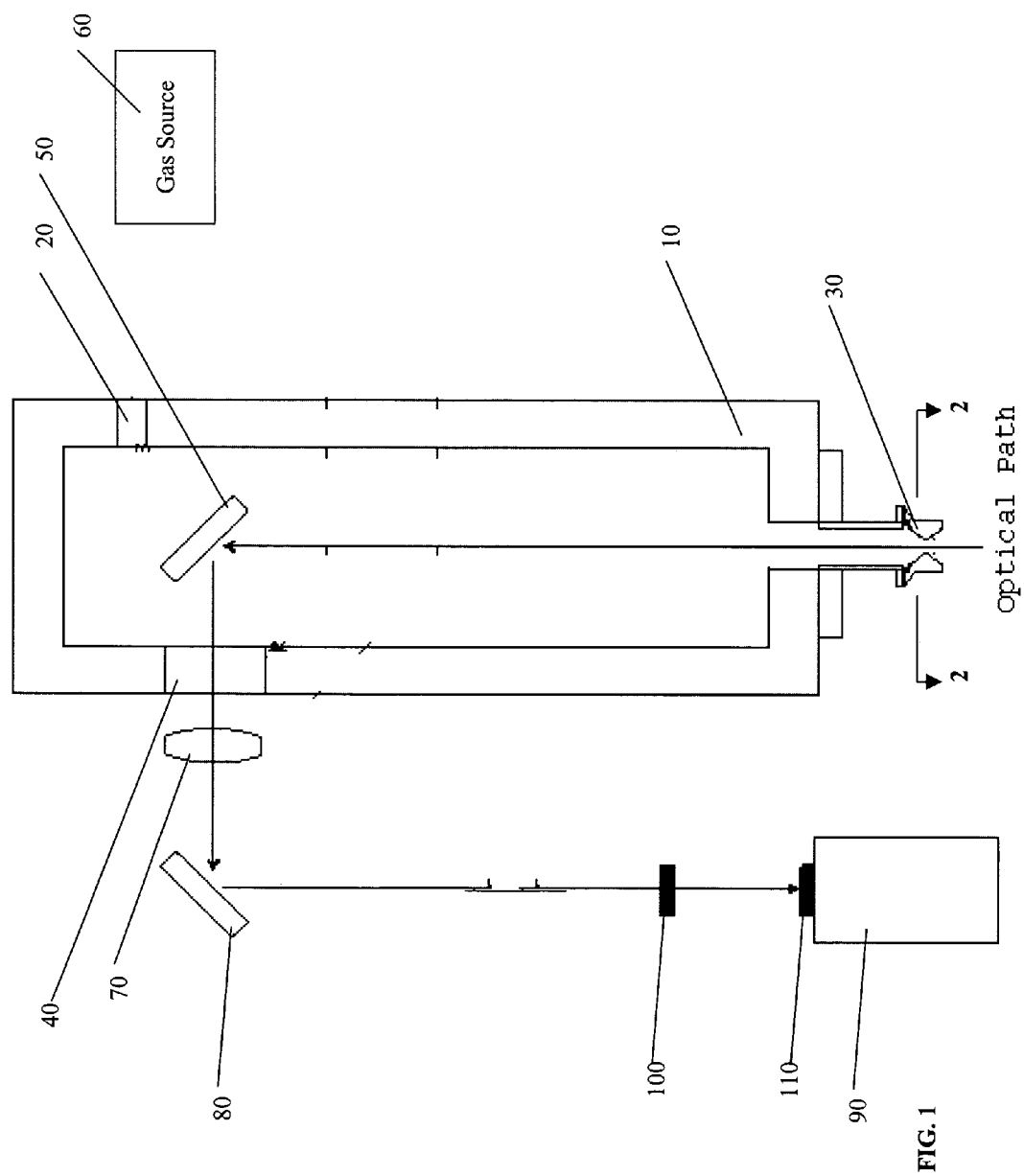
FIG. 1 is a cross-sectional view of an embodiment of the invention.

FIG. 1 shows an embodiment of the inventive apparatus. The apparatus includes a gas chamber 10 having a gas feed nozzle 20, an exhaust nozzle 30, and a window 40. The apparatus also includes a first partial reflector 50, in the gas chamber 10, sharing an optical path with the exhaust nozzle 30, and the window 40.

Optionally, the apparatus further includes a gas source 60 communicating with the gas feed nozzle 20. For example, the gas source 60 includes a gas having an ionization potential higher than air, which has an ionization potential of 12 eV. For example, the gas source 60 includes a gas having a nonlinear index of refraction lower than air; nitrogen, an approximation for air, has a nonlinear susceptibility of $107 \times 10^{-39}$ esu. For example, the gas includes helium, which has an ionization potential of 24 eV and a nonlinear susceptibility of $4 \times 10^{-39}$ esu, or neon, which has an ionization potential of 20 eV and a nonlinear susceptibility of $7.6 \times 10^{-39}$ esu.

Figure 2:
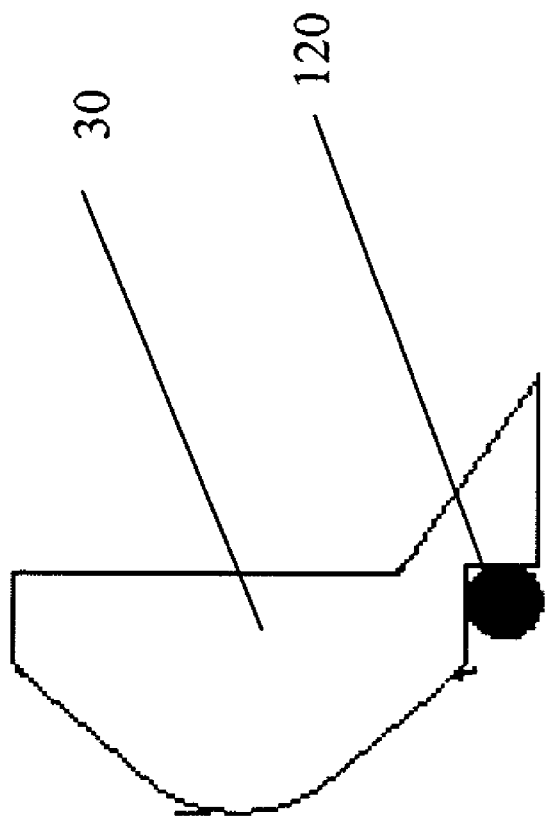
FIG. 2 is a cross-sectional view taken through line 2-2 of FIG. 1 of an embodiment of an exhaust nozzle of an embodiment of the invention.

Optionally, the exhaust nozzle 30 includes a venturi shape. Optionally, at least one seal 120, such as a gasket or an O-ring as shown in FIG. 2, is interposed between at least a portion of the exhaust nozzle 30 and the gas chamber 10.

Optionally, the first partial reflector 50 includes filter glass. For example, light reflects off either the front surface of the partial reflector or the back surface of the partial reflector, but not both. A reflection of 10% or less is preferred.

Optionally, the apparatus further includes a lens 70 outside of the gas chamber 10 and sharing the optical path. For example, the lens 70 includes a converging spherical lens, a converging aspherical lens, an achromat, a curved spherical mirror, or a curved parabolic mirror.

Optionally, the apparatus further includes a mirror 80 outside of the gas chamber 10 and sharing the optical path. For example, the mirror 80 has a minimum 20% bandwidth relative to the gas to be studied. For example, the mirror 80 includes a broadband dielectric mirror. For example, the mirror 80 includes a metal, such as aluminum.

Optionally, the apparatus further includes a camera 90 sharing said optical path. The type of camera is selected such that the camera signal response is linear with respect to the laser filament intensity. For example, the camera 90 includes a charge coupled device {"CCD") array.

Optionally, the apparatus further includes a neutral density ("ND") filter sharing the optical path between the mirror 80 and the camera 90, or a second partial reflector sharing the optical path between the mirror 80 and the camera 90. The optical density of the neutral density filter is selected to avoid saturating the camera 90. For example, for a standard CDD array camera and a fluence of around 0.5 J/cm$^2$, the neutral density filter includes a first neutral density filter 100 having an optical density of 0.5 and a second neutral density filter 110 having an optical density of 4.0, as shown in FIG. 1. Alternatively, for a standard CDD array camera and for a fluence of around 0.5 J/cm$^2$, the neutral density filter includes a single neutral density filter preferably having an optical density between 4 and 5.

Optionally, the shape and dimensions of the gas chamber 10 are selected to permit laminar flow of the gas. If a Reynolds number of the gas chamber 10 is much greater than one, then the gas flow in the gas chamber is turbulent. So, for example, the gas chamber 10 preferably includes a Reynolds number less than 1000.

An illustrative embodiment of the invention and a discussion of illustrative operation are provided as follows. Helium gas slowly flows into a rectangular chamber 10 with inner dimensions 350×100×100 mm$^3$ and flows out of an exhaust nozzle 30 mounted on one of the chamber walls. Laser filaments to be characterized enter the helium chamber 10 through the exhaust nozzle 30. Because of the low nonlinear susceptibility ($4 \times 10^{-39}$ esu) and high ionization potential (24 eV) of helium, most, if not all, nonlinear processes are arrested within the chamber 10. The filaments therefore expand due to diffraction, which reduces the filament intensity on any optic positioned far enough downstream of the gas feed nozzle 20. With the intensity reduced, a portion of the radiation energy is collected using a first partial reflector 50, such as a high quality filter glass. The filter glass, for example, reduces the intensity of the radiation to be sampled downstream. The use of filter glass is also advantageous because, for example, it absorbs the transmitted light, which minimizes any nonlinear interaction of the transmitted light and the reflection from the back surface. After reflecting off the filter glass, the laser filaments pass out of the gas chamber 10 through a window 40 and is collected by a lens 70, such as a 50 mm diameter f/5 achromat. It is then reflected off of a mirror 80, such as an aluminum mirror, transmitted through two reflective ND filters 100, 110, and finally collected by a camera 90, such as a CCD array. The lens 70 is, for example, positioned such that the plane at the nozzle entrance is imaged onto the CCD array 90 with magnification unity. The ND filters 100, 110, for example, have a flat response from 500 to 1000 nm. The CCD array has, for example, 8 bits of dynamic range and 1024×768 pixels.

The image quality obtained by the camera 90 can be affected by turbulence resulting from the flow of helium through the nozzle. Also, the object plane can be defined optimally, as the length of the air-helium transition region vanishes. The characteristics of the air-helium interface and the degree of turbulence are determined primarily by the nozzle design and the helium flow rate. Apertures that restrict the flow suddenly, such as a standard optical iris, induce turbulence and substantially reduce image quality. The instant invention's exhaust nozzle preferably restricts the flow gradually, such as is shown in FIG. 2, and thus helps in overcoming this problem. In an embodiment of the invention, turbulent flow does not occur in the main body of the chamber 10 because its large cross sectional area minimizes the fluid velocity. In an embodiment of the invention, the effects of turbulence are hardly noticeable for flow rates of up to 10 scfh.

Obviously, many modifications and variations of the present invention are possible in light of the above teachings without departing from the true scope and spirit of the invention. It is therefore to be understood that the scope of the invention should be determined by referring to the following appended claims.

What is claimed is:

1. An apparatus comprising:
   a gas chamber comprising a gas feed nozzle, an exhaust nozzle, and a window;
   a first partial reflector, in said gas chamber, sharing an optical path with said exhaust nozzle, and said window; and a mirror outside of said gas chamber and sharing said optical path, wherein said mirror has a minimum 20% bandwidth.

2. The apparatus according to claim 1, wherein said mirror comprises a broadband dielectric mirror.

3. An apparatus comprising:
   a gas chamber comprising a gas feed nozzle, an exhaust nozzle, and a window;
   a first partial reflector, in said gas chamber, sharing an optical path with said exhaust nozzle, and said window; and
   a mirror outside of said gas chamber and sharing said optical path, wherein said mirror comprises a metal.

4. The apparatus according to claim 3, wherein said metal comprises aluminum.

5. An apparatus comprising:
   a gas chamber comprising a gas feed nozzle, an exhaust nozzle, and a window;
   a first partial reflector, in said gas chamber, sharing an optical path with said exhaust nozzle, and said window;
   a camera sharing said optical path, wherein said camera comprises a charge coupled device array; and
   one of a neutral density filter sharing said optical path between said mirror and said camera, and a second partial reflector sharing said optical path between said minor and said camera.

6. An apparatus comprising:
   a gas chamber comprising a gas feed nozzle, an exhaust nozzle, and a window; and
   a first partial reflector, in said gas chamber, sharing an optical path with said exhaust nozzle, and said window, wherein said gas chamber comprises a Reynolds number less than 1000.

* * * * *